United States Patent [19]

Nakagawa et al.

[11] Patent Number: 4,772,957
[45] Date of Patent: Sep. 20, 1988

[54] PHOTOELECTRIC CONVERSION APPARATUS

[75] Inventors: Katsumi Nakagawa; Hideo Kanno, both of Kawasaki; Yasuo Kuroda, Sagamihara; Katsunori Hatanaka, Yokohama, all of Japan

[73] Assignee: Canon Kabushiki Kaisha, Tokyo, Japan

[21] Appl. No.: 36,182

[22] Filed: Apr. 9, 1987

Related U.S. Application Data

[63] Continuation of Ser. No. 721,651, Apr. 10, 1985, abandoned.

[30] Foreign Application Priority Data

Apr. 16, 1984 [JP] Japan .................................. 59-74921

[51] Int. Cl.$^4$ ............................................. H04M 1/04
[52] U.S. Cl. ..................................... 358/280; 358/294; 250/578
[58] Field of Search ............... 358/213, 294, 293, 280, 358/167; 250/578, 204

[56] References Cited

U.S. PATENT DOCUMENTS

| | | | |
|---|---|---|---|
| 4,300,163 | 11/1981 | Wada et al. | 358/213 |
| 4,390,755 | 4/1983 | Endlicher et al. | 358/167 |
| 4,500,927 | 2/1985 | Ozawa | 358/167 |
| 4,511,804 | 4/1985 | Ozawa | 358/167 |

Primary Examiner—Edward L. Coles, Sr.
Attorney, Agent, or Firm—Fitzpatrick, Cella, Harper & Scinto

[57] ABSTRACT

A photoelectric conversion apparatus includes light reception elements which are rendered enabled under application of voltage; a first memory section for storing outputs from the light reception elements in the enabled state; a second memory section for storing outputs from the light reception elements in a disabled state; and an arithmetic operation circuit for correcting the contents of the first memory section in accordance with the contents of the second memory section.

6 Claims, 5 Drawing Sheets

PHOTOELECTRIC CONVERSION APPARATUS

This application is a continuation of application Ser. No. 721,651 filed 4/10/85 now abandoned.

BACKGROUND OF THE INVENTION

1. Field of the Invention

The present invention relates to a photoelectric conversion device intended to attain a good signal-to-noise ratio and to simplify the structure, the photoelectric conversion device being applied to the input unit for characters, figures, images and the like in facsimiles and digital copiers.

2. Description of the Prior Art

In a so-called line sensor having a plurality of light reception elements disposed in an array, particularly in an elongated line sensor, it is important to transfer input signals from respective light reception elements to succeeding signal processing units, image forming units, and image transference units, while retaining a high signal-to-noise ratio as well as reliably separating respective input signals.

FIGS. 1 and 2 are circuit diagrams showing a linear photoelectric conversion apparatus according to the prior art.

In the figures, light reception elements $C_{i1}$ $C_{i2}$, ... $C_{in}$ ($1 \leq i \leq m$) n in number constitute a single block, and blocks m in number constitute a photosensor array 1.

For the purpose of description herein, the subscript i of the light reception element $C_{ij}$ is used for indicating the block number, while the subscript ($1 \leq j \leq n$) is used for indicating the number of a particular light reception element in the block including that element.

Referring now to FIG. 1, one terminal of the light reception element $C_{ij}$ is connected to a common electrode $B_i$, one of which is provided for each corresponding block, while the other terminal, in combination with those having the same second subscript is connected to a corresponding separate electrode $S_1$, $S_2$, ..., $S_n$.

The common electrode $B_i$ is connected to a scanning circuit 2, and the separate electrode $S_j$ is connected to the input terminal of an amplifier $A_j$ of an amplifier unit 3. The output terminals of the amplifier $A_j$ are arranged such that any one of them is connected by means of a switch unit 4 to an analog/digital converter 5 from which a digital signal is derived.

The scanning circuit 2 sequentially selects the common electrode $B_i$ in response to shift pulses SH1 and applies a predetermined voltage $V_i$ to the block connected to the selected common electrode $B_i$. Upon application of the voltage $V_i$, the light reception elements $C_{i1}$ to $C_{in}$ of the block are enabled.

Photocurrent corresponding in amount to the incident light intensity passes through the enabled light reception elements $C_{i1}$ to $C_{in}$, the photocurrent signals being amplified by the amplifiers $A_1$ to $A_n$. The amplified photocurrent signals are sequentially input by means of the switch unit 4 to the A/D converter 5 to thereby output a digital time-sequential signal.

Alternatively, in the circuit shown in FIG. 2, the output terminal of an amplifier $A_j$ is connected to an A/D converter $AD_j$ of which the output terminal is connected to the input terminal of $SR_j$ constituting a stage of a shift register 6.

In operation, upon selection of the common electrode $B_i$ by means of the scanning circuit 2, the light reception elements $C_{i1}$ to $C_{in}$ are enabled so that each photocurrent signal is amplified by one of the amplifiers $A_1$ through $A_n$ and in turn converted by the A/D converter $AD_1$ through $AD_n$ into a digital form to be stored in $SR_1$ through $SR_n$ of the shift register 6. In response to the shift pulses SH2 from the control section, the shift register 6 outputs the stored contents in the form of a time sequential signal. In the above circuit arrangement the time period from the time instant when the voltage $V_i$ is applied to the common electrode $B_i$ to the time instant when the photocurrent signals of the light reception elements belonging to the selected block are read out. is constant for each light reception element $C_{i1}$ through $C_{in}$.

In the prior art circuits shown in FIGS. 1 and 2, the scanning circuit 2 sequentially selects the common electrode $B_i$ and applies the predetermined voltage $V_i$. In this case, the other, non-selected common electrodes (i.e., those other than $B_i$) are supplied with zero potentials. Since the input potential to the amplifier $A_j$ is intended to be zero, the light reception elements connected to the non-selected common electodes are not applied with any voltages, so that no current is expected to flow. Thus, it is expected that the amplifier $A_j$ is input with only the photocurrent from the light reception element connected to the common electrode and thus the amplifier $A_j$ amplifies only the input photocurrent.

However, in practice, the following potential differences exist.

(1) It is difficult to drive the non-selected common electrodes so as to maintain their potentials completely at zero potential. Common bipolar CMOS IC driving causes 10 to 50 mV potentials.

(2) An input offset voltage is generated at the amplifier $A_j$ connected to the separate electrode. The voltage is generally on the order of $\pm 10$ mV which is added to the separate electrode.

Due to these additional voltages, a current flows through the non-selected light reception element and is superposed upon the photocurrent signal of the selected light reception element. Therefore, the resultant signal has crosstalk and a degraded S/N ratio.

Generally, in order to solve the above problems, a method has been used in which a blocking diode for blocking a crosstalk current is serially connected to each light reception element constituting the photosensor array 1. The blocking diode is commonly implemented as a Schottky diode on the same substrate as the light reception element, aiming at a reduction in the number of processes required for the implementation and at the realization of a compact dimension.

However, it is difficult to manufacture with a good yield such a diode with a small reverse leakage current and characteristics that are uniform over the length of the elongated sensor. This results in an extraordinarily low yield in manufacturing an elongated linear photoelectric conversion apparatus.

SUMMARY OF THE INVENTION

It is an object of the present invention to solve the above prior art problems.

It is another object of the present invention to provide a photoelectric conversion apparatus in which a favorable S/N characteristic with no crosstalk can be attained and manufacturing yield can be improved, without utilizing blocking diodes.

According to one aspect of the present invention is provided a photoelectric conversion apparatus wherein a current flowing through a light reception element in a non-selected state is detected, and a photocurrent signal of the light reception element in a selected state can be corrected using the detected current value.

According to another aspect of the present invention is provided a photoelectric conversion apparatus which comprises light reception means which is rendered enabled under application of voltage; first memory means for storing an output from the light reception means during application of voltage; second memory means for storing an output from the light reception means during nonapplication of voltage and arithmetic operation means for correcting the contents of the first memory means in accordance with the contents of the second memory means.

These and other features and advantages of the present invention will be understood more fully from a consideration of the following detailed description of the preferred embodiments thereof, taken in conjunction with the accompanying drawings.

BRIEF DESCRIPTION OF THE DRAWINGS

FIGS. 4(a), 4(b) and 4(c), shows waveforms of preset voltages applied and a photocurrent signal in the embodiment of FIG. 3;

DETAILED DESCRIPTION OF THE PREFERRED EMBODIMENTS

The photoelectric conversion apparatus according to the present invention is characterized in that the apparatus comprises light reception means which is rendered enabled under application of voltage; first memory means for storing an output from the light reception means at the enabled state; second memory means for storing an output from the light reception means at a disabled state; and arithmetic operation means for correcting the contents of the first memory means in accordance with the contents of the second memory means. Although the general outline the invention is as stated, it will be described in more detail in connection with the following embodiments.

In the present invention, the light reception means mentioned above is a light reception element or a photosensor array having light reception elements disposed therein. The photosensor is arranged, for example, to have blocks each having a predetermined number of light reception elements. The first and second memory means mentioned above are shift registers for example, each shift registers, being in the form of a serial write-in/serial read-out or a parallel write-in/serial read-out register.

The first preferred embodiment of the present invention will now be described in detail with reference to the accompanying drawings.

Figure 1:
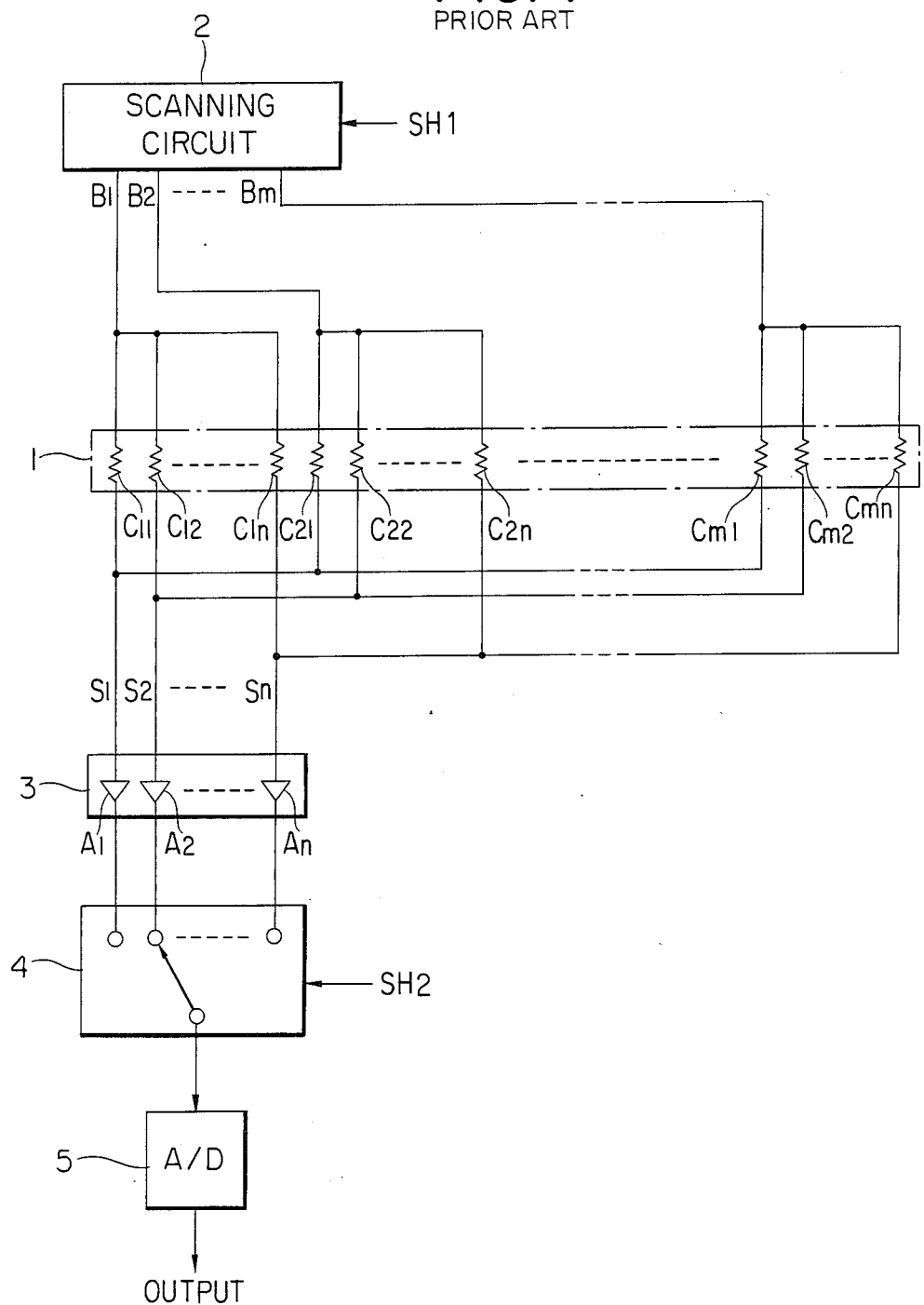
FIG. 1 is a circuit diagram in block form showing one example of a prior art photoelectric conversion apparatus.
Figure 2:
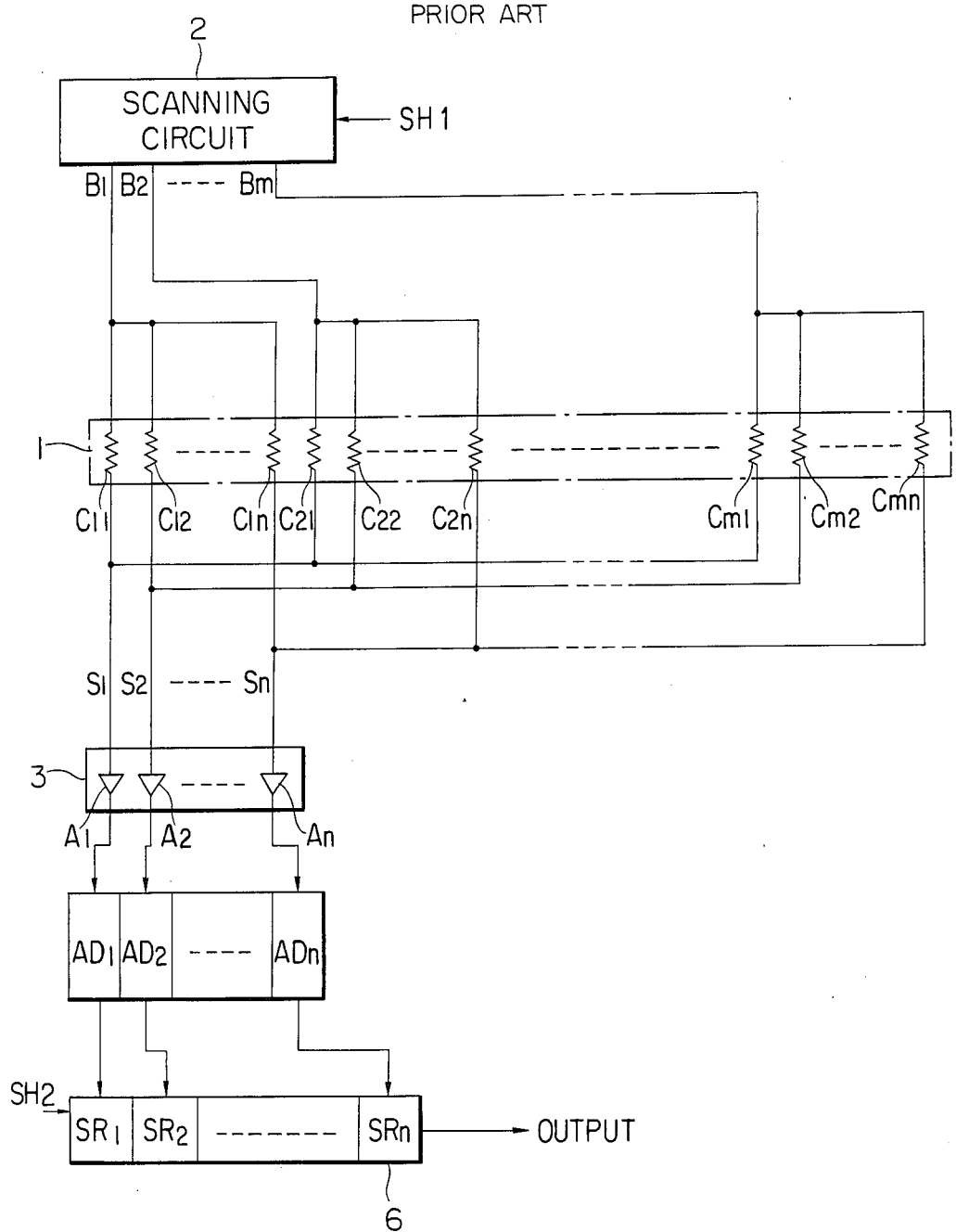
FIG. 2 is a circuit diagram in block form showing another example of a prior art photoelectric conversion apparatus.
Figure 3:
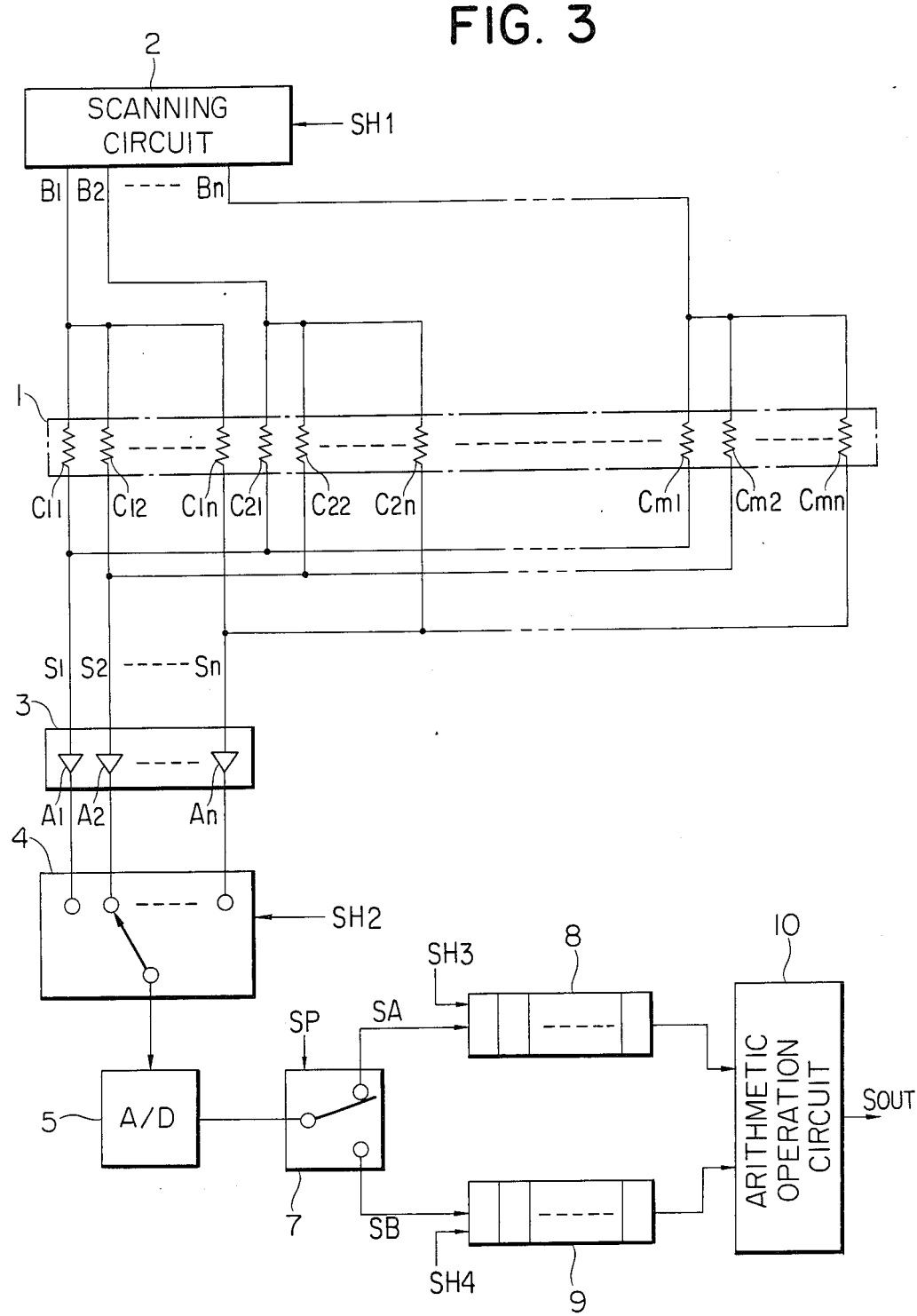
FIG. 3 is a circuit diagram in block form showing one preferred embodiment of the photoelectric conversion apparatus according to the present invention.

FIG. 3 is a circuit diagram in block form showing the first embodiment of the photoelectric conversion apparatus according to the present invention, wherein identical references have been used to represent the same elements as of the conventional apparatus and the description thereof has been omitted.

In the figure, the output terminal of an A/D converter 5 is connected to the input terminal of a change-over unit 7. One of the output terminals of the change-over unit 7 is connected to the input terminal of a shift register 8, while the other output terminal is connected to the input terminal of a shift register 9.

The output terminal of the shift register 8 is connected to one of the input terminals of an arithmetic operation circuit 10, and the output terminal of the shift register 9 is connected to the other input terminal of the arithmetic operation circuit 10.

Furthermore, from a control section (not illustrated), a shift pulse SH1 is input to a scanning circuit 2, a shift pulse SH2 is to a switch unit 4, a change-over pulse SP is to the change-over unit 7, and shift pulses SH3 and SH4 are respectively to the shift registers 8 and 9.

Figure 4:
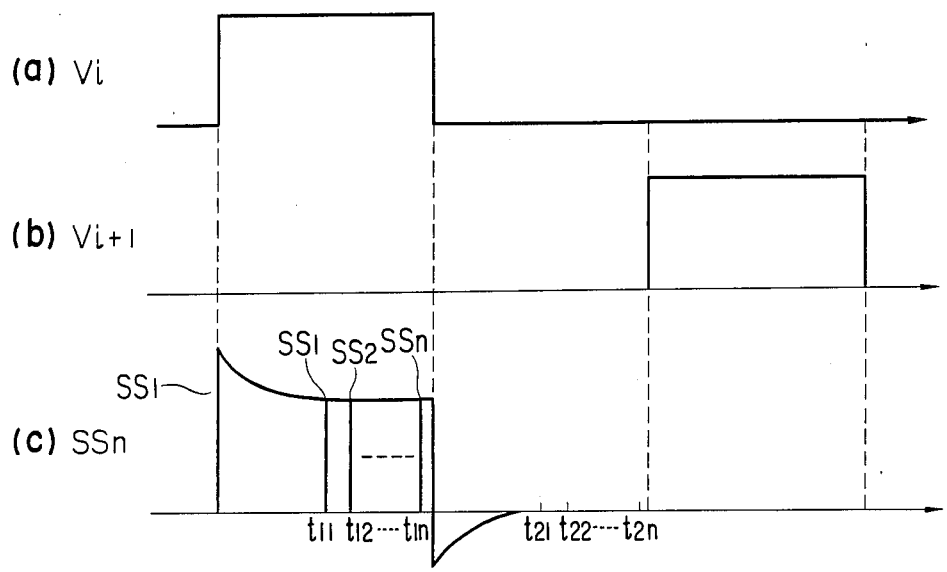
FIG. 4, comprising
Figure 5:
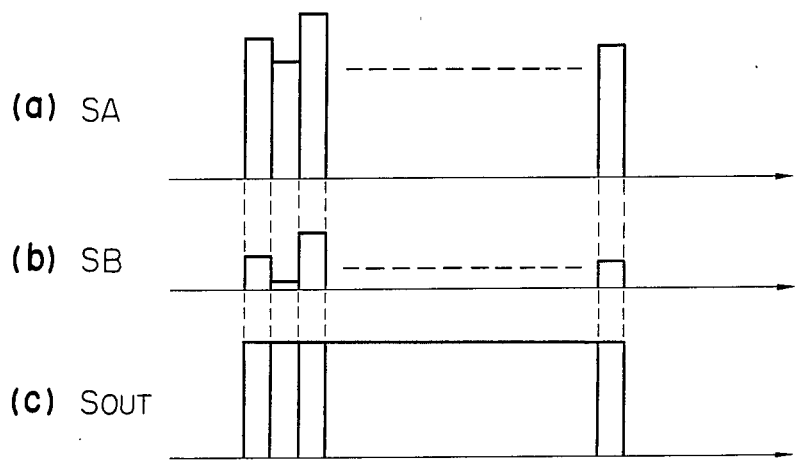
FIG. 5 compares FIGS. 5(a), 5(b), and 5(c) which are is schematic diagrams of time sequential signals for explaining the operation of the embodiment of FIG. 3.

Next, the operation of the embodiment constructed as above will be described with reference to FIGS. 4 and 5.

FIGS. 4(a) and 4(b) show waveforms illustrating the timings of a preset voltage $V_i$; FIG. 4(c) shows a waveform of a photocurrent signal; FIGS. 5(a) and 5(b) show schematic diagrams illustrating the contents of the shift registers 8 and 9; and FIG. 5(c) shows a schematic diagram of the output of the arithmetic operation circuit 10.

The common electrode $B_i$ for each block in a photosensor array 1 is sequentially selected by the scanning circuit 2 and is applied with a voltage $V_i$ (FIG. 4(a)).

The scanning circuit 2 is constructed of shift registers, switching transistors, and the like. Every time a shift pulse SH1 is input to the shift register, the scanning circuit 2 selects the common electrode in the order of $B_1, B_2, \ldots, B_m$ and repeats the selection cyclically.

The light reception elements $C_{i1}$ to $C_{in}$ of the block to which the voltage $V_i$ is applied are rendered enabled to thereby cause photocurrents to flow corresponding to light intensities. For the purpose of convenience of explanation, it is assumed here that light with the same intensity is input to each light reception element $C_{i1}$ through $C_{in}$.

Therefore, photocurrent signals $SS_1$ to $SS_n$ having substantially the same amplitudes appear at the output terminals of the amplifiers $A_1$ to $A_n$ (FIG. 4(c)).

As the photocurrent signals $SS_1$ to $SS_n$ become stable, the switch unit 4 sequentially selects the photocurrent signal to deliver it to the A/D converter 5. In particular, as shown in FIG. 4(c), at a time instant $t_{11}$ the photocurrent signal $SS_1$ output from the amplifier $A_1$ is output to the A/D converter 5, and succeedingly similar to the above, at each time instant $t_{12}, t_{13}, \ldots, t_{1n}$ each photocurrent signal $SS_1, SS_2, \ldots, SS_n$ is sequentially output to the A/D converter 5.

The switch unit 4 is constructed of shift registers, switching transistors and the like. Every time a shift pulse SH2 is changed in a similar way as stated above. Therefore, in order to read out photocurrent signals of all of the light reception elements of the photosensor array 1, the switch unit 4 must operate so as to deliver all of the photocurrent signals $SS_1$ to $SS_n$ to the A/D converter 5 within the time duration while the voltage $V_i$ (FIG. 4(a)) is being applied to the common electrode $B_i$ under control of the scanning circuit 2. In other words, the frequencies of the shift pulses SH1 and SH2 are so determined as to perform such operations.

Thus, a time sequential signal SA in the digital form of the photocurrent signals $SS_1$ to $SS_n$ is output from the A/D converter 5 and is input to the change-over unit 7.

The change-over unit 7 has two states, i.e., while the selected common electrode is applied with the voltage $V_i$, the output from the A/D converter 5 is input to the shift register 8; and while no common electrode is selected, the output is input to the shift register 9.

The change-over unit 7 is constructed of switching transistors and alternately changes over between the above two states in response to the change-over pulse SP.

Since the input is now the time sequential signal SA, the change-over unit 7 connects the A/D converter 5 to the shift register 8 so that the time sequential signal SA is input to the shift register 8 (FIG. 5(a)).

As already mentioned, the time sequential signal SA is a signal which may contain crosstalk.

After the time sequential signal SA is stored in the shift register 8, the scanning circuit 2 makes the common electrode $B_i$ have a zero potential, and maintains all of the common electrodes at a non-selected state during the time until a voltage $V_{i+1}$ is applied to the next common electrode $B_{i+1}$ (FIG. 4(b)).

At this non-selected condition, the change-over unit 7 is input with the change-over pulse SP, the state being changed over to that where the A/D converter 5 is connected to the shift register 9.

Then, as the output from the amplifier $A_1$ through $A_n$ becomes stable, the switch unit 4 is supplied with a shift pulse SH2 and sequentially selects the output from the amplifier $A_1$ through $A_n$ to deliver it to the A/D converter 5. In particular, as shown in FIG. 4(c), at each time instant $t_{21}, t_{22}, \ldots, t_{2n}$ the output from the amplifier $A_1, A_2, \ldots, A_n$ is output to the A/D converter 5.

As mentioned previously, even at the non-selected state that none of the light reception elements of the photosensor array 1 are applied with voltage, current flows through the light reception elements due to the residual potential of the scanning circuit 2 and the offset voltage of the amplifier $A_j$. The current is superposed upon the photocurrent, thereby causing a crosstalk and degradation of the S/N characteristics. This means that the output from the amplifier $A_1, A_2, \ldots, A_n$ at the non-selected state is noise to be removed.

As above, the time sequential signal SB as noises is output from the A/D converter 5 and is stored in the shift register 9 through the change-over unit 7 (FIG. 5(b)).

Succeedingly, shift pulses SH3 and SH4 are input to the shift registers 8 and 9 to thereby input to the arithmetic operation circuit 10 the time sequential signal SA as a photocurrent signal stored in the shift register 8 as well as the time sequential signal SB as noises stored in the shift register 9. The arithmetic operation circuit 10 calculates the difference between both signals SA and SB and outputs a time sequential signal $S_{out}$ from which noises are removed (FIG. 5(c)). The arithmetic operation can be performed before the photocurrent signals of the next block are fetched.

The above operations are carried out for every block so that time sequential signals $S_{out}$ from which noises are removed can be obtained for all of the light reception elements $C_{ij}$.

Figure 6:
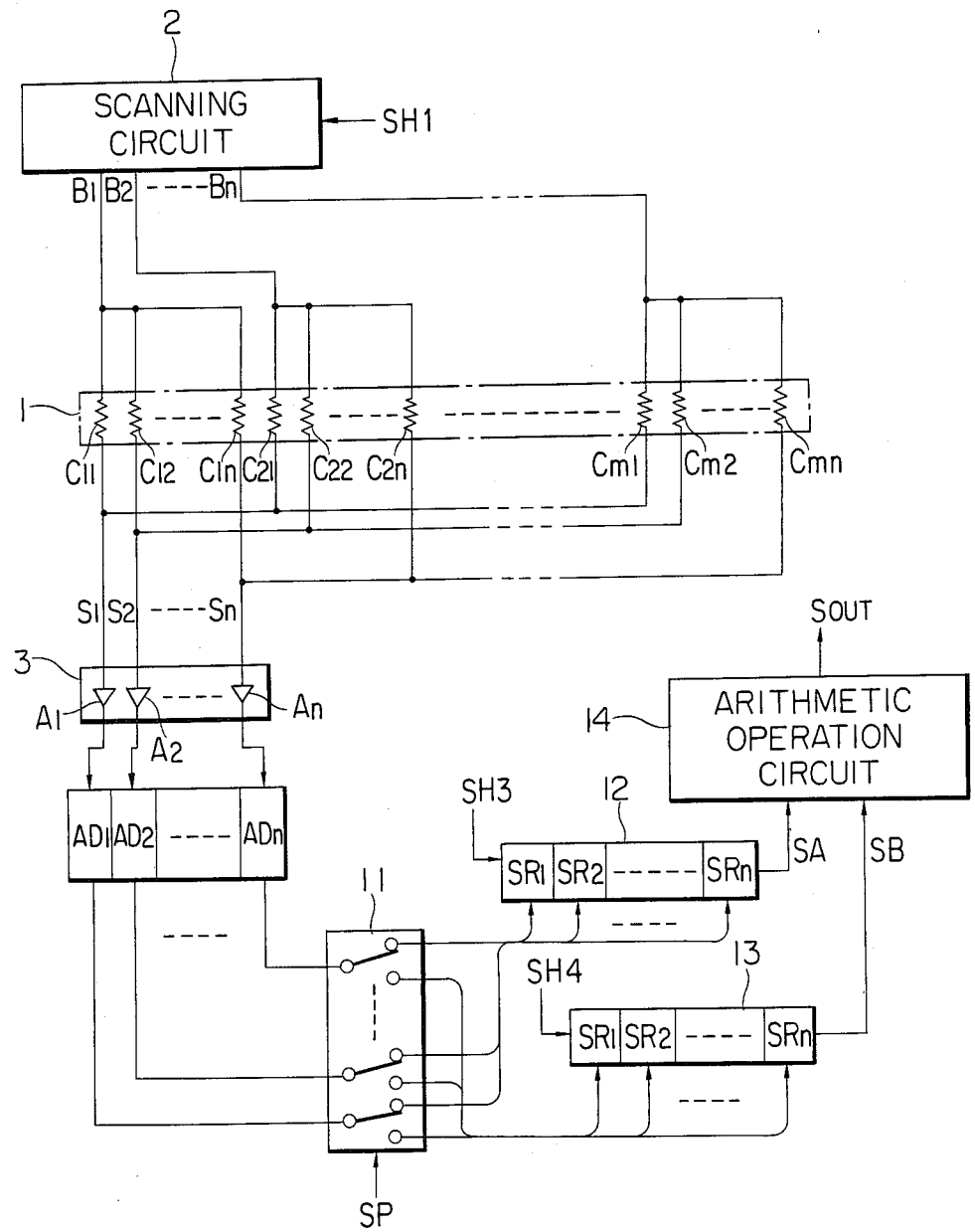
FIG. 6 is a circuit diagram in block form showing another embodiment of the present invention.

FIG. 6 is a circuit diagram in block form of the second embodiment of the present invention.

In the figure, the output terminal of the amplifier $A_j$ is connected to an A/D converter $AD_j$ of which the output terminal is connected to the input terminal of a change-over unit 11.

The change-over unit 11 is constructed of switching transistors and has two states to be changed over in response to a change-over pulse SP. In the first state, the A/D converter $AD_j$ is connected to a shift register 12 while a common electrode $B_i$ is at a selected state. In the second state, the A/D converter $AD_j$ is connected to a shift register 13 while the common electrodes are in a non-selected state. Both registers are in this case of a parallel write-in/serial read-out type.

The output terminal of the shift register 12 is connected to one input terminal of an arithmetic operation circuit 14, while the output terminal of the shift register 13 is connected to the other input terminal of the arithmetic operation circuit 14.

Next, the operation of the above embodiment will be described.

As the scanning circuit 2 selects the common electrode $B_i$ and the voltage $V_i$ is applied to the light reception elements $C_{i1}$ to $C_{in}$, each photocurrent signal is amplified at each amplifier $A_1$ to $A_n$. The photocurrent signal is converted into a digital photocurrent signal at the A/D converter $AD_1$ through $AD_n$ and the digital signal is input to the change-over unit 11.

As the photocurrent signal becomes stable, the change-over unit 11 takes the above first state so that each digital photocurrent signal is input in parallel and stored in the shift register 12 (FIG. 5(a)).

Succeedingly, the scanning circuit 2 makes all of the common electrodes $B_i$ have zero potentials, or take a non-selected state until a voltage $V_{i+1}$ is applied to the next common electrode $B_{i+1}$.

At the time when the non-selected state becomes stable, the change-over unit 11 is input with a change-over pulse SP to thereby take the above second condition. Thus, a digital signal representing noise is input in parallel and stored in the shift register 13 (FIG. 5(b)).

Succeedingly, shift pulses SH3 and SH4 are input to the shift register 12 and 13 to thereby input to the arithmetic operation circuit 10 the time sequential signal SA from the shift register 12 and the time sequential signal SB from the shift register 14. The arithmetic operation circuit 14 calculates the difference between both signals SA and SB and outputs a time sequential signal $S_{out}$ from which noise is removed (FIG. 5(c)). The above operations are carried out for every block so that time sequential signal $S_{out}$ from which noise is removed can be obtained for all of the light reception elements $C_{ij}$, similarly to the first embodiment.

In the second embodiment, the output data from each light reception element in one block can be derived at the same time instant. Therefore, it is advantageous in that the output data is not influenced by its fluctuation with time.

As seen from the above description, in the photoelectric conversion apparatus according to the present invention, data from the light reception element is detected while the element is not in an enabled state and the detected data is used to correct the photocurrent signal from the light reception element in an enabled state. Therefore, it is possible to obtain a signal with a good S/N characteristic and without crosstalk.

In addition, since diodes or the like are not needed for preventing a crosstalk, the structure is simplified and the manufacturing yield is improved.

What we claim is:

1. A photoelectric conversion apparatus comprising:
   a light receiver for generating and outputting a photoelectric conversion signal according to a quantity of light received during application of voltage;
   means for applying the voltage to said light receiver;
   an amplifier for amplifying an output of said light receiver, thereby to produce an amplified output of said light receiver;
   a first memory for storing the amplified output from said light receiver during application of the voltage;
   a second memory for storing the amplified output from said light receiver during non-application of the voltage; and
   an arithmetic operation circuit for cancelling noise included in the signal stored in said first memory by means of the signal stored in said second memory.

2. a photoelectric conversion apparatus according to claim 1, wherein said light receiver is a light reception element.

3. A photoelectric conversion apparatus according to claim 1, wherein said light receiver is a photosensor array.

4. A photoelectric conversion apparatus according to claim 1, wherein said light receiver comprises a plurality of light reception elements which are divided into blocks each having a predetermined number of said light reception elements.

5. A photoelectric conversion apparatus according to claim 1, wherein said first memory is a shift register.

6. A photoelectric conversion apparatus according to claim 1, wherein said second memory is a shift register.

* * * * *

UNITED STATES PATENT AND TRADEMARK OFFICE
CERTIFICATE OF CORRECTION

PATENT NO. : 4,772,957

DATED : September 20, 1988

INVENTOR(S) : KATSUMI NAKAGAWA, ET AL.   Page 1 of 2

It is certified that error appears in the above-identified patent and that said Letters Patent is hereby corrected as shown below:

AT [56] IN REFERENCES CITED

U.S. Patent Documents,
"4,390,755   4/1983   Endlicher et al." should read
--4,380,755   4/1983   Endlicher et al.--.

COLUMN 1

Line 27, "elements $C_{11}$ $C_{12}$, ..." should read
--$C_{11}$, $C_{12}$, ...--.
Line 32, "subscript ($1 \lessapprox j \lessapprox n$)" should read
--subscript j ($1 \lessapprox j \lessapprox n$)--.
Line 39, "subscript is" should read --subscript j is--.

COLUMN 2

Line 3, "verter $AD_1$" should read --verters $AD_1$--.
Line 7, "arrangement" should read --arrangement,--.
Line 12, "out." should read --out,--.
Line 66, "invention is" should read --invention, there is--.

COLUMN 3

Line 4, "invention" should read --invention, there--.
Line 11, "voltage" should read --voltage;--.
Line 34, "compares" should read --comprises--.
Line 34, "5(c)" should read --5(c),--
Line 35, "is" should be deleted.
Line 53, "outline the" should read --outline of the--.
Line 62, "registers" should read --registers,--.
Line 63, "registers," should read --register--.

UNITED STATES PATENT AND TRADEMARK OFFICE
CERTIFICATE OF CORRECTION

PATENT NO. : 4,772,957

DATED : September 20, 1988

INVENTOR(S) : KATSUMI NAKAGAWA, ET AL.    Page 2 of 2

It is certified that error appears in the above-identified patent and that said Letters Patent is hereby corrected as shown below:

COLUMN 5

Line 45, "a" should be deleted.

COLUMN 6

Line 44, "shift register 12 and 13" should read --shift registers 12 and 13--.
Line 47, "shift register 14." should read --shift register 13.--.

COLUMN 7

Line 2, "a" should be deleted.

COLUMN 8

Line 4, "a" should read --A--.

Signed and Sealed this

Fourth Day of July, 1989

Attest:

DONALD J. QUIGG

Attesting Officer

Commissioner of Patents and Trademarks